Aug. 20, 1963 W. C. ELMORE 3,101,417
MAGNETIC CORE DEVICE
Original Filed Dec. 3, 1952
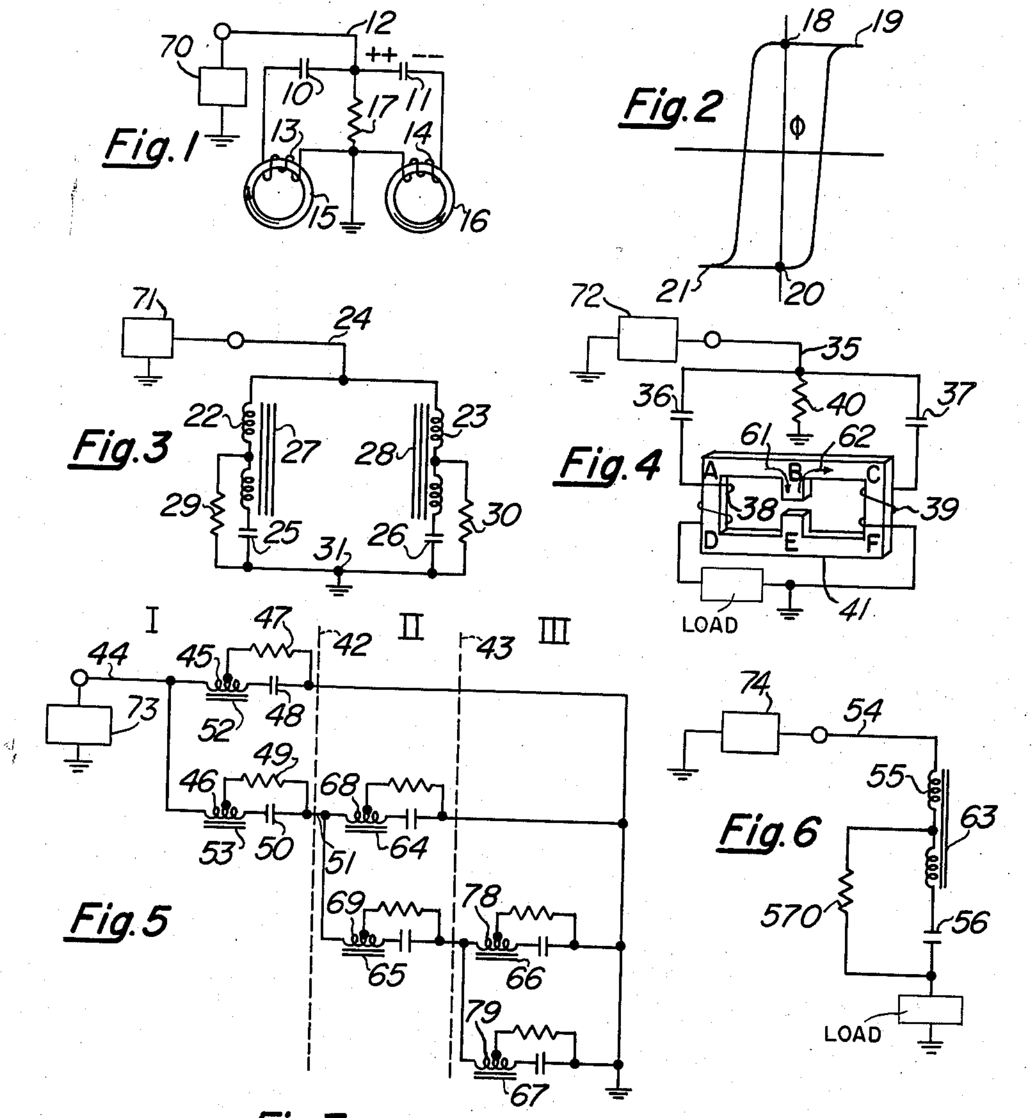
Fig. 1, Fig. 2, Fig. 3, Fig. 4, Fig. 5, Fig. 6
Fig. 7
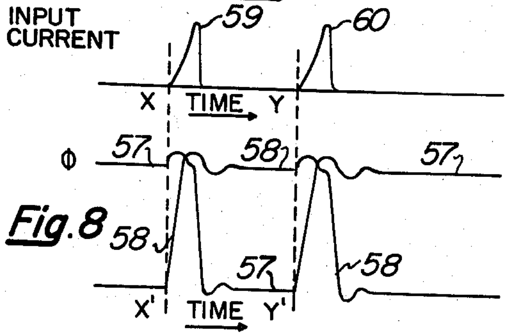
Fig. 8
INVENTOR
WILLIAM C. ELMORE
BY
Donald W. Phillion
ATTORNEY 3,101,417
Patented Aug. 20, 1963

3,101,417
MAGNETIC CORE DEVICE

William C. Elmore, Swarthmore, Pa., assignor to Burroughs Corporation, Detroit, Mich., a corporation of Michigan Continuation of application Ser. No. 323,828, Dec. 3, 1952. This application June 2, 1961, Ser. No. 116,651
35 Claims. (Cl. 307—88)

This application is a continuation of an earlier filed co-pending application entitled Magnetic Device, Serial No. 323,828, and now abandoned and filed by applicant on December 3, 1952.

This invention relates generally to binary counters and more particularly to binary counters comprising magnetic cores whose magnetic flux condition indicates the state of the counter.

In many fields, particularly the computing fields, binary counting devices have become of prime importance in the performance of arithmetic operations. Many binary counters based on mechanical, electromechanical and electronic principles have been developed. In the case of mechanical or electromechanical binary counters relative slowness of operation is inherent therein due to the movement of physical mass. Also characteristic of the movement of physical mass are problems of wear and deterioration with use and age. The electronic devices, although capable in many cases of high speed operation, have characteristics of critical voltages, and, further, there is often a change in electron discharge device characteristics with age and use, thus presenting initial design problems as well as maintenance requirements. It would mark a definite improvement in the art to have a reliable binary counter means having no moving parts or electron discharge devices and whose characteristics will not change appreciably with age or use.

An objective of the present invention is a reliable counting means.

A further objective of the invention is a high speed binary counting means utilizing the remanent conditions of magnetic materials as the basis of the bistable conditions.

A third object of the invention is a binary counting means having no moving parts.

Another object is a magnetic binary counting means having simplicity of structure and, further, having characteristics that remain stable with age and use.

Another object of the invention is to improve binary counters generally.

In accordance with one embodiment of the invention a plurality of binary counters having an input means and a output means are arranged in a cascaded manner with the output of each binary counter being connected to the input of the next succeeding binary counter. Each of said binary counters is comprised of magnetic core means adapted to be in a state of either positive or negative remanence and having a winding means associated therewith for the twofold purpose of energizing said magnetic cores and also presenting a high or a low impedance to an input pulse depending upon the remanence condition of said magnetic core means. Capacitor means and circuit discharge means are associated with said winding means. Said capacitor means is adapted to be charged sufficiently when said winding means present a low impedance to said input pulse to discharge, upon the termination of said input pulse, a large enough current through said circuit discharge means which comprises at least a portion of said winding means to cause said magnetic core means to reverse its remanence polarity.

In accordance with another embodiment of the invention there is a first magnetic flux path and a second magnetic flux path each having a winding associated therewith adapted to energize said magnetic flux paths and a capacitor associated with each of said windings adapted to become charged when the associated winding presents a low impedance to an input pulse, and a circuit means adapted to discharge said charged capacitor at the termination of said input pulse through the said associated winding in such a manner as to reverse the polarity of remanence of the magnetic flux path associated with said associated winding, the magnetic flux conditions of said first and second magnetic flux paths in either of the two stable states of the device being so adapted that the winding associated with either one of them will present a low impedance to a given input pulse and the other of said windings will present a high impedance to said input pulse.

In accordance with another embodiment of the invention the binary counter means has a first terminal and a second terminal and two series circuit combinations each having a tapped winding and a capacitor connected in parallel between said first and second terminal. Capacitor discharge circuits are connected from each of said taps across the associated capacitor to said first or second terminals. Associated with each of said tapped windings is a magnetic core.

In accordance with another embodiment of the invention a tapped winding is connected in series with a capacitance between a first and second terminal. Means for applying input pulses are connected across said first and second terminals. Discharge paths for said capacitance are comprised of an impedance connected to said tapped winding and across said capacitor. Associated with said tapped winding is a magnetic core having substantially square wave hysteresis loop characteristics.

In accordance with one feature of the above described embodiments of the invention the winding associated with the magnetic core means presents either a high or a low impedance to an input pulse depending upon the state of the magnetic core, thus causing the capacitor means to be charged either to a relatively high degree or to a relatively low degree. If the capacitor is charged to said relatively high degree it is so adapted that upon discharging through a discharge path provided therefor and comprising at least a portion of the tapped winding associated with said magnetic core means the said magnetic core means will be caused to reverse its polarity of magnetic remanence.

These and other objects and features of the invention will be more fully understood from the following detailed description when read in conjunction with the drawings in which:

FIG. 1 is a schematic diagram of one embodiment of the invention using two separate magnetic cores;

FIG. 2 is an illustration of an hysteresis loop of a typical magnetic material suitable for use in this invention;

FIG. 3 is a schematic diagram of the invention utilizing two magnetic cores, each having associated therewith a tapped winding;

FIG. 4 is a combination schematic sketch and isometric view of an embodiment of the invention using two magnetic flux paths having a common portion;

FIG. 5 is a schematic sketch of the invention having a plurality of binary counters cascaded in such a manner as to form a three stage counting apparatus;

FIG. 6 is a schematic sketch of the invention utilizing a single core and tapped winding;

FIG. 7 shows typical input pulse to the circuits shown in FIGS. 1, 3, 4, 5, and 6; and FIG. 8 shows typical flux patterns of the magnetic flux paths of FIGS. 1, 3, 4, 5, and 6.

Referring now to FIG. 1, there is shown a schematic sketch of the invention utilizing two separate magnetic cores 15 and 16. 100 to 1000 micromicrofarad capacitors 10 and 11 are connected to input conductor 12. Connected in series with capacitors 10 and 11 are windings 13 and 14 respectively which are wound around the magnetic cores 15 and 16 respectively. The number of turns in windings 13 and 14 preferably is about 100 turns. The core material in the preferred embodiment is of a ferrite and has a cross sectional area of approximately .009 square inch and a length of approximately .8". Materials other than ferrite are suitable for cores such as for example, deltamax, molybdenum or permalloy. An important characteristic of the magnetic material is that it have a substantially square magnetic hysteresis loop. 2500 ohm resistor 17 is connected between the terminal 12 and the junction between windings 13 and 14. Input pulse source 70 is connected to the input conductor 12.

Referring now to FIG. 2, there is shown a typical hysteresis loop of a suitable magnetic material. Positive remanence is designated as being point 18 and positive saturation at point 19. Negative remanence is defined as being point 20 and negative saturation as point 21.

In FIG. 3 center tapped windings 22 and 23 are connected to input conductor 24. It is to be noted that the position of the taps along the windings 22 and 23 of FIG. 3 is a matter of engineering design. The criteria for locating the position of the taps are that there must be a sufficient number of turns on either side of the taps to cause the associated magnetic cores to switch their polarity of magnetic flux remanence when the respective switching currents are caused to flow therethrough. In the preferred embodiments shown in FIGS. 3, 5, and 6, the tap is positioned at the center point of the windings although other tap positions could easily be incorporated. Connected in series with center tapped windings 22 and 23 are 100 to 1000 micromicrofarad capacitors 25 and 26. Magnetic cores associated with windings 22 and 23 are schematically represented as designated by reference characters 27 and 28. Each of the half sections of the center tapped windings 22 and 23 has 150 turns in this preferred embodiment of the invention. 2000 ohm resistances 29 and 30 are connected from the center taps of windings 22 and 23, respectively, to the common junction 31 to which capacitors 25 and 26 are also connected. Input pulse source 71 is connected to the input lead 24 and is adapted to apply input pulses on the input lead 24.

In FIG. 4, 100 to 1000 micromicrofarad capacitors 36 and 37 are connected to input conductor 35. Connected in series with said capacitors 36 and 37 are 100 turn windings 38 and 39 respectively. The other terminals of windings 38 and 39, are connected to a common junction shown in FIG. 4 as ground potential. Also connected to ground potential from input conductor 35 is 2500 ohm resistor 40. Magnetic core 41 has two primary magnetic flux paths therein which may be designated as paths ABED and BCFE. Leg BE, which has an air gap of approximately 0.01 inch therein, is common to both of said primary flux paths. The mean length of each primary flux path is approximately 0.5 inch and the cross sectional area of all of the legs is approximately .01 square inch. Input pulse source 72 is connected to input conductor 35 and is adapted to apply input pulses to this conductor.

Referring now to FIG. 5 there is shown a schematic sketch of a plurality of binary counters cascaded to form a counting circuit with a counting capacity of 16. The dashed lines 42 and 43 separate the circuit into three stages designated as stage I, stage II, and stage III. Each stage is comprised of an individual binary counter. Since each of the stages is identical, the circuit elements of only one stage will be described. In the first stage (I) at the left of FIG. 5 input lead 44 is connected to the first terminals of 150 turn windings 45 and 46. Capacitors 48 and 50 are connected respectively to end terminals of tapped windings 45 and 46. Resistor 47 is connected from the center tap of winding 45 across the capacitor 48. Resistor 49 is connected from the center tap of winding 46 across the capacitor 50. The capacitors 48 and 50 may each have a value of from 100 to 1000 micromicrofarads and resistors 47 and 49 may each have a value of 2000 ohms. Windings 68 and 69 of cores 64 and 65 are similarly connected, as are windings 78 and 79 of cores 66 and 67. Thus, operation of stages I, II and III is identical except that the input pulses are modified as they pass through each successive stage. The output conductor 51 of the binary counter stage I is also the input of the next succeeding stage I. Magnetic cores similar to those described in connection with either FIG. 1, FIG. 3, or FIG. 6 are represented schematically by reference characters 52 and 53. Input pulse source 73 is connected to the input conductor 44 and adapted to apply input pulses to the input conductor 44.

In FIG. 6 input conductor 54 is connected to one terminal of 300 turn center tapped winding 55. Capacitor 56 which has a value of 200 micromicrofarads is connected to the other terminal of winding 55. Resistor 570 which has a value of 2000 ohms is connected to the center tap of winding 55 and across capacitor 56. Element 63 can be a magnetic core similar to that described with respect to FIG. 1. Input pulse source 74 is connected to the input conductor 54 and is adapted to apply input pulses to the input conductor 54. A load, indicated by a box labeled "Load," may correspond to stages II and III of FIG. 5 wherein each stage consists of an identical device connected together in the manner illustrated in FIG. 5 to form a counting circuit.

Referring now to FIG. 1 the operation of the circuit therein will be discussed. Assume that the core 16 is in a remanent condition which is arbitrarily designated as positive remanence as shown by the direction of flux flow indicated by the arrow in the core 16 and the core 15 is in a remanent condition which is herein arbitrarily defined as negative remanence as shown by direction of flux flow indicated by the arrow in core 15. Assume further that positive current flowing from input conductor 12 through capacitor 11, winding 14 to ground will always tend to cause core 16 to be saturated in the positive polarity and that a current from input conductor 12 through capacitor 10 and winding 13 to ground will always tend to cause core 15 to also become saturated in a positive polarity.

If under the assumptions given above a first positive input pulse from source 70 is applied to input conductor 12, winding 14 will present a low impedance thereto since the core 16 is already in its positive remanent condition. Therefore, a relatively high current will flow from input conductor 12 through capacitor 11 and winding 14 to ground, thus causing capacitor 11 to be charged in accordance with the current passing therethrough. Winding 13, however, will present a high impedance to this positive input pulse since core 15 is in a condition of negative remanence. Therefore, a relatively small portion of the input pulse will flow from input conductor 12 through capacitor 10 and winding 13 to ground, thus creating a much smaller charge on capacitor 10 than was acquired by capacitor 11.

Reference is now made to FIGS. 7 and 8 to assist in explaining the remaining portion of a cycle of operation. FIG. 7 shows typical input pulses applied to input conductor 12 of FIG. 1. In FIG. 8, curve 58 illustrates the flux condition of core 15 before, during, and after the application of input pulses 59 and 60 of FIG. 7 at the times X and Y, respectively. Curve 57 of FIG. 8 shows the flux condition of core 16 before, during, and after application of the input pulses 59 and 60 of FIG. 7. It is to be noted that the time scales of the abscissas of FIGS. 7 and 8 are coincident. More specifically, time X of FIG. 7 corresponds to time X' of FIG. 8 and time Y of FIG. 7 corresponds to time Y' of FIG. 8. Upon application of the first positive pulse from source 70, which is shown as pulse 59 of FIG. 7, the current flowing through winding 13, although relatively small compared to the current flowing through winding 14, is large enough to cause core 15 to reverse its remanence from a negative polarity to a positive polarity, as can be seen from an inspection of curve 58 of FIG. 8. The flux condition of core 16 merely changes from a condition of positive remanence to positive saturation during the duration of the input pulse on input lead 12. It is to be noted, however, that as the input pulse 59 begins to drop off sharply, the flux condition of core 16 begins to change from substantially positive saturation to negative remanence. This occurs in the following manner. During the time that the input pulse is passing through capacitor 11, capacitor 11 is acquiring substantial electrical charge which, upon termination of said input pulse, is discharged in a path which may be traced from the plate of capacitor 11, through capacitor 10, the winding 13, winding 14, and back to the other plate of capacitor 11. As will be observed, this current flows through winding 13 in a direction tending to maintain core 15 in its newly acquired condition of positive remanence and flows through winding 14 in a direction tending to cause core 16 to become negatively saturated. The circuit constants as given in the preferred embodiment of the invention are such that this discharge current in capacitor 11 is sufficiently large to cause core 16 to become negatively saturated and subsequently return to a negative remanent condition. Thus, it can be seen that the application of one pulse upon input terminal 12 will cause the core 15 to go from a state of negative remanence to a state of positive remanence and the core 16 to go from a state of positive remanence to a state of negative remanence, thus completing a cycle of operation.

Assume that a second positive input pulse 60 shown in FIG. 7 is now impressed upon input conductor 12 at time Y. Winding 13 will offer only a relatively small impedance to said second input pulse 60 since the core 15 is in a condition of positive remanence and the input pulse will cause it to go to a condition of substantial positive saturation. Consequently, a relatively large electrical charge will be acquired by capacitor 10. On the other hand, winding 14 will present a relatively large impedance to said input pulse 60 since core 16 is in a state of negative remanence and the current flow therethrough is in a direction tending to cause said core 16 to become positively saturated. Capacitor 11 will, therefore, acquire only a relatively small charge insufficient upon discharging to have any appreciable effect on the magnetic flux conditions of cores 15 or 16. Inspection of the curves 57 and 58 beginning at time Y' will show the changes in the flux conditions of magnetic cores 15 and 16 when input pulse 60 of FIG. 7 is applied to input lead 12 of FIG. 1. Curve 57, representing the flux condition of core 16, shows that the magnetic flux of core 16 changes rapidly from negative remanence to positive saturation while curve 58, representing the flux condition of core 15, shows that the magnetic flux of core 15 changes from positive remanence to positive saturation. During this period capacitor 10 acquires a relatively large electric charge. When the input pulse 60 begins to decrease rapidly, the capacitor 10 begins to discharge through a circuit which may be traced from the positively charged plate of capacitor 10, through capacitor 11, winding 14, and winding 13, to the negative plate of capacitor 10. It is to be noted that the current flow through winding 13 is in such a direction as to cause the magnetic core 15 to become negatively saturated as shown in FIG. 8. Subsequently, magnetic core 15 will return to negative remanence as is also shown in FIG. 8. Thus, it can be seen that input impulse 60 will cause magnetic core 15 to switch from a condition of positive remanence to a condition of negative remanence and will cause magnetic core 16 to switch from a condition of negative remanence to a condition of positive remanence.

It is to be noted that negative pulses instead of positive pulses, applied to input lead 12 of FIG. 1 will also cause the binary counter to operate, although in this case the winding that would otherwise present a high impedance to a positive input pulse would present a low impedance to a negative input pulse and the winding that would otherwise present a low impedance to a positive input pulse would present a high impedance to a negative input pulse. The above discussion regarding negative input pulses applies also to the other embodiments of the invention herein shown and described.

In FIG. 2 there is shown a typical hysteresis loop of cores 15 and 16. When core 15, for example, is in a condition of negative remanence its flux is represented by point 20 of the curve of FIG. 2. Then when the positive input pulse is impressed upon input lead 12, core 15 is caused to be saturated in a positive direction represented by point 19 of FIG. 2. At the termination of the input pulse condenser 11 discharges and core 15 is maintained (during a portion of the discharge) substantially in a saturated condition as represented by point 19. Core 16, however, which before the initiation of the input pulse has a remanence of positive polarity as indicated by point 18 of FIG. 2 and during the input pulse had been near positive saturation as represented by point 19, upon the termination of the input pulse and the subsequent discharge of capacitor 11 is caused to become negatively saturated as represented by point 21. After condenser 11 is discharged, core 16 returns to negative remanence as indicated by point 20 of FIG. 2. Similarly, core 15 returns to its state of positive remanence as indicated by point 18 of FIG. 2.

Referring now to FIG. 4, there is shown an embodiment of the invention utilizing a magnetic core means which has two principal magnetic paths having a portion thereof common to each other. This common portion, leg BE, of FIG. 4 has an air gap therein. The principal function of the air gap is to prevent a permanent magnetization being set up in leg BE which would cause disturbances in the desired magnetic symmetry in legs ABED and BCFE. In the operation of the device shown in FIG. 4, positive magnetic flux will be designated as flowing in a direction as indicated by arrows 61 and 62. Since the device is symmetrical the flux flow through leg BE is theoretically zero and flux may be traced around path ABCFED. It can be seen from FIG. 4 that winding 38 is wound in such a direction that a positive input pulse impressed upon input lead 35 will cause the flux in path ABED to become positively saturated in the direction of the arrow 61, so that the winding 38 consequently, will present a low impedance to input pulse impressed upon input lead 35 when the path ABCFED is in a condition of positive remanence. The same input pulse, however, will flow through winding 39 in such a direction as to tend to cause magnetic path BCFE to become saturated in a negative polarity, opposite the direction of the arrow 62. Consequently, the winding 39 will present a high impedance to said input pulse impressed upon input lead 35. It should be noted that this current impulse through winding 39 is of sufficient magnitude to cause magnetic path BCFE to become negatively saturated. This magnetic flux will flow through leg BE and across the air gap therein during this period of time when magnetic path BCFE is saturated in a negative polarity and magnetic path ABEF is in a condition of substantially positive remanence. The magnetic fluxes from the two paths ABED and BCFE will flow additively through leg BE. At the termination of the input pulse capacitor 36 will discharge in a path extending through capacitor 37, winding 39, winding 38, back to capacitor 36 tending to cause magnetic path BCFE to become more negatively saturated, and through winding 38 in such a direction as to cause magnetic flux path ABED to become negatively saturated. Upon the completion of the discharge of capacitor 36 magnetic path ABED will return to a condition of negative remanence and magnetic path BCFE will likewise return to a condition of negative remanence. A subsequent positive input pulse upon input lead 35 will, in a manner similar to that described with respect to FIG. 1, cause magnetic path ABED to acquire positive remanence, and magnetic path BCFE to acquire positive remanence. A load, indicated by a box labeled "Load" may correspond to stage II and III of FIG. 5 wherein each stage consists of an identical device connected together as shown to form a counting circuit.

The resistance 40 provides a path for eventual dissipation of the energy stored in either of the capacitors 36 or 37 by an input pulse impressed on lead 35. It is to be noted that the curves of FIGS. 2, 7, and 8 pertain, for practical purposes, to the circuit of FIG. 4.

Referring now to FIG. 3, the operation of the circuit shown therein will be described. Assume that center tapped winding 22 is wound around magnetic core 27 in such a manner that a positive input pulse upon input lead 24 will cause core 27 to become saturated in the positive polarity and assume further that center tapped winding 23 is wound around magnetic core 28 in such a manner that a positive input pulse impressed on input lead 24 will cause magnetic core 28 to become saturated in a positive polarity. Assume still further that magnetic core 27 is in a condition of positive remanence in the beginning of the example of operation herein to be described and that magnetic core 28 is in a condition of negative remanence at the beginning of operation. When the positive pulse is applied to input conductor 24, capacitor 25 will acquire a relatively large electrical charge since center tapped winding 22 offers a small impedance to current flow therethrough. Capacitor 26, however, will acquire a relatively small electrical charge since center tapped winding 23 offers a large impedance to current flow therethrough due to the fact that the current through winding 23 must switch magnetic core 28 from a condition of negative remanence to a condition of positive saturation. At the termination of the input pulse, capacitor 25 will discharge through winding 22, winding 23, capacitor 26, and back to capacitor 25. Another discharge path for capacitance 25 is through the lower portion of winding 22 and resistance 29. It will be noted that the current discharge thorugh winding 22 is in such a direction as to cause magnetic core 27 to switch from a positive remanence to a condition of negative saturation, and further, that the portion of the discharge current which flows through winding 23 is in such a direction as to drive core 28 toward positive saturation. At the termination of the discharge of capacitor 25, magnetic core 27 will return to a condition of negative remanence. Resistors 29 and 30 provide a means of preventing substantial oscillation in the circuit by providing a path for dissipation of the charge on a capacitor. In other words, during the time that switching is occurring in winding 22 the inductance presented by winding 22 is high and the switching speed is rapid. However, after the magnetic core 27 has been switched from positive remanence to negaitve saturation the inductance presented by windings 22 and 23 to the current flow from capacitor 25 is relatively small and dissipation occurs rapidly through resistors 29 and 30, thus effectively damping out any serious oscillations. It is to be noted that negative input pulses will also cause the circuit to operate, as discussed with respect to FIG. 1.

Referring now to FIG. 6, the operation of the circuit therein will be described. Assume that winding 55 is wound around magnetic core 63 in such a manner as to cause magnetic core 63 to tend to become magnetically saturated in a positive polarity when a positive input pulse is impressed upon input conductor 54. Assume further that at the beginning of the operation magnetic core 63 is in a condition of positive remanence. If an input pulse is then applied upon input conductor 54, center tapped winding 55 will offer a relatively small impedance thereto and capacitor 56 will acquire a relatively large charge which upon termination of the input pulse will discharge in a circuit extending from the positively charged plate of capacitor 56, through the lower portion of the center tapped winding 55 of FIG. 6, resistance 570, and back to the negatively charged plate of condenser capacitor 56. It will be noted that the discharge current of capaictor 56 through the lower portion of the center tapped winding 55 is in such a direction as to cause the magnetic core 63 to become negatively saturated and subsequently to return to negative remanence at the end of the discharge of capacitor 56. A second input pulse impressed upon capacitor 54 will cause magnetic core 63 to become positively saturated. The winding 55, therefore, will present a high impedance to the second input pulse and consequently, only a small electric charge will be acquired by capacitor 56. Therefore, in the discharge of capaictor 56, there will be insufficient discharge current flow to substantially alter the positive flux condition of magnetic core 63.

Referring now to FIG. 5, the operation of the circuit therein will be described. A series of input pulses applied upon input conductor 44 will cause magnetic cores 52 and 53 to alternately assume positive and negative remanence flux condition in accordance with the description of operation of the circuits of FIGS. 1, 3 and 4, particularly FIG. 3. Thus, on every alternate pulse, winding 46, associated with the magnetic core 53 will present a low impedance to an input pulse. This low impedance to an input pulse will permit an input pulse to pass through to the output conductor 51 of stage I which is also the input conductor for the binary counter of stage II. Thus, the binary counter in stage II will be caused to operate once on every alternate pulse applied on input conductor 44 and therefore, on every fourth input pulse applied on conductor 44, winding 69 will present a low impedance to the pulse appearing on the output terminal 51 of stage I. Every fourth pulse will, consequently, pass through winding 69 to actuate the binary counter in stage III. It can then be seen that on every eighth pulse applied on input conductor 44, winding 79 will present a low impedance thereto since the associated magnetic core 67 will have the appropriate remanent condition. Suitable means, not shown herein, can be utilized to detect the passage of current through any one of the stages I, II, III.

It is to be understood that the descriptions of this invention shown herein are but preferred embodiments of the same and that various changes may be made in circuit arrangements, circuit constants, and type materials used without departing from the spirit or scope of said invention.

I claim.

1. Counting means comprising a plurality of binary counters each including input and output terminals, said plurality of binary counters arranged in a cascaded series of stages with the output terminal of each binary counter connected to the input terminal of the next succeeding binary counter, and an input pulse source adapted to impress an input pulse on the input terminal of the first binary counter in the cascaded arrangement, each of said binary counters further comprising magnetic core means adapted to be in a state of positive or negative remanence, winding means associated with each said magnetic core means adapted to present a high or low impedance to an input pulse impressed upon its input terminal in accordance with the remanence condition of said magnetic core means, each input pulse applied to the terminals of any one of said counters being of sufficient magnitude to cause the magnetic core means thereof to reverse its remanence polarity, a plurality of capacitor means each connected to one of said winding means and adapted to be electrically charged by a pulse impressed upon the input terminals thereof, and circuit means comprising at least a portion of said winding means and adapted to provide a discharge path for said capacitor means, each of said capacitor means being adapted to be charged sufficiently when its associated winding means presents a low impedance to said input pulse to discharge a large enough current through a portion of said winding means to cause said magnetic core means to reverse its remanence polarity.

2. Counting means in accordance with claim 1 in which each said magnetic core means comprises a first magnetic flux path and a second magnetic flux path, in which each said winding means comprises a first winding adapted to energize said first magnetic flux path and a second winding adapted to energize said second magnetic flux path, in which each said capacitor means comprises a first capacitor means and a second capacitor means, said first capacitor means being connected to said first winding and adapted to become charged when said first winding presents a low impedance to an input pulse, said second capacitor means being connected to said second winding and adapted to become charged when said second winding presents a low impedance to an input pulse, and in which said circuit means is adapted to cause said first capacitor means, when charged, to discharge through said first winding means in such a manner as to reverse the polarity of remanence of said first magnetic flux path and to cause said second capacitor means, when charged, to discharge through said second winding in such a manner as to change the polarity of remanence of said second magnetic flux path.

3. Counting means in accordance with claim 1 in which said winding means consists of a first tapped winding means and a second tapped winding means, in which said capacitor means consists of a first capacitor means and a second capacitor means, said first capacitor means and said first tapped winding means being connected in series, said second capacitor and said second tapped winding means being connected in series, said circuit means comprising a first impedance means and a second impedance means, said first impedance means being connected from the tap of said first tapped winding across said first capacitor to said output terminal, and said second impedance means being connected from the tap of said second tapped winding across said second capacitor to said output terminal.

4. Counting means in accordance with claim 3 in which said first capacitor means is of such a value that after being charged by an input pulse when said first winding presents a low impedance to said input pulse it will discharge a sufficient current through a portion of said first center tapped winding means to cause said first magnetic flux path to reverse the polarity of its magnetic remanence, and in which said second capacitor means is of such a value that after being charged by an input pulse when said second winding presents a low impedance to said input pulse it will discharge a sufficient current through a portion of said second tapped winding to cause said second magnetic flux path to reverse the polarity of its magnetic remanence.

5. Counting means comprising a plurality of binary counters each capable of assuming bistable magnetic states and comprising an input terminal and an output terminal, said plurality of binary counters arranged in a cascaded manner with the output terminal of each binary counter connected to the input terminal of the next succeeding binary counter, each of said binary counters further comprising magnetic core means adapted to be in a state of positive or negative remanence representing the two bistable states of each of said binary counters, winding means associated with said magnetic core means and adapted to present a high or low impedance to an input pulse applied thereto in accordance with the remanence condition of said magnetic core means, capacitor means connected to said winding means, and circuit means comprising at least a portion of said winding means to discharge said capacitor through said portion of said winding means, said capacitor means being adapted to become sufficiently charged by said input pulse when said winding means presents a low impedance to said input pulse to discharge a sufficient current through said circuit means to cause said magnetic core means to become substantially saturated in a polarity which presents a high impedance to a subsequent input pulse.

6. Counting means in accordance with claim 5 in which said magnetic core means comprises a first magnetic flux path and a second magnetic flux path, in which said winding means comprises a first winding means adapted to energize said first magnetic flux path and a second winding means adapted to energize said second magnetic path, in which each said capacitor means comprises a first capacitor means connected in series with said first winding means, and a second capacitor means in series with said second winding means, said circuit means further comprising a first impedance means and a second impedance means, said first impedance means being connected across at least a portion of said first winding means and said first capacitor means, and said second impedance means being connected across at least a portion of said second winding means and said second capacitor means.

7. Counting means in accordance with claim 5 in which said winding means comprises a center tapped winding, in which said capacitor means is connected in series with said winding means, and in which said circuit means comprises an impedance connected from the center tap of said center tapped winding across said capacitance, and in which the input pulse to each of said binary counters is applied to said series combination of said center tapped winding and said capacitor means.

8. A magnetic device comprising a first magnetic core and a second magnetic core each capable of assuming stable magnetic remanent states, a first winding associated with said first magnetic core, a second winding associated with said second magnetic core, a first capacitor means connected in series with said first winding means, a second capacitor means connected in series with said second winding means, impedance means connected across said first winding means and said first capacitor means, said impedance means being further connected across said second winding means and said second capacitor means, and input means connected to said impedance means.

9. A magnetic device in accordance with claim 8 in which said first magnetic core and said second magnetic core are of a magnetic material having a substantially square magnetic hysteresis loop characteristic.

10. A magnetic device comprising a first stage and a second stage, each of said stages comprising material forming a magnetic flux path, such magnetic material being capable of assuming stable remanent magnetic states, a winding means to energize said magnetic material, and capacitor means connected to a terminal of said winding means, an electric discharge circuit for said capacitor means comprising at least a portion of the winding means associated with the other of said stages for discharging electrical charge acquired by said capacitor means, signal input means adapted to apply input signals into each of said stages.

11. A magnetic device in accordance with claim 10 in which said magnetic flux path is of a material having a substantially square magnetic hysteresis loop characteristic.

12. Binary counter means comprising magnetic material capable of assuming alternate magnetic remanent states forming a first magnetic flux path and a second magnetic flux path, a first tapped winding means coupled electromagnetically with said first magnetic flux path, a second tapped winding means coupled electromagnetically with said second magnetic flux path, a first capacitor means connected to a first terminal of said first tapped winding means, a second capacitor means connected to a first terminal of said second tapped winding means, a first impedance means connected to the tap of said first tapped winding means and across said first capacitor means, a second impedance means connected to the tap of said second tapped winding means and across said second capacitor means, signal input means connected across said first tapped winding means and said first capacitor means, said signal input means further connected across said second tapped winding means and said second capacitor means.

13. Binary counting means in accordance with claim 12 in which said first magnetic flux path means and said second magnetic flux path means are of a material having a substantially square wave magnetic hysteresis loop characteristic.

14. Binary counter means comprising a first terminal and a second terminal, magnetic material capable of assuming alternate magnetic remanent states forming a first magnetic flux path means and a second magnetic flux path means, a first tapped winding means adapted to energize said first magnetic flux path means, a second tapped winding means adapted to energize said second magnetic flux path means, a first capacitor means connected in series with said first tapped winding means, the said series connection of said first tapped winding means and said first capacitor means being connected between said first terminal and said second terminal, a second capacitor means connected in series with said second tapped winding means, the said series connection of said second tapped winding means and said second capacitor means being connected between said first terminal and said second terminal, a first impedance path connected to the tap of said first tapped winding means and across said first capacitor means to one of said first and second terminals, a second impedance path connected to the tap of said second tapped winding means and across said second capacitor means to one of said first and second terminals, and a signal input means connected to one of said first and second terminals.

15. Binary counting means in accordance with claim 14 in which said first magnetic flux path means and said second magnetic flux path means each consists of a closed loop of magnetic material having a substantially square wave hysteresis loop characteristic.

16. Binary counting means in accordance with claim 14 in which said first magnetic flux path means and said second magnetic flux path means each consist of a closed loop of magnetic material having a substantially square hysteresis loop characteristic and in which said capacitors are of sufficiently large capacitance to change the polarity of remanence of at least one of said magnetic flux paths when discharging through the associated winding means.

17. Binary counter means comprising magnetic material forming a first magnetic flux path and a second magnetic flux path, said magnetic material being capable of assuming stable remanent states of opposite flux polarity, a first winding means adapted to energize said first magnetic flux path, a second winding means adapted to energize said second magnetic flux path, a first terminal and a second terminal, a first capacitor means being connected in series arrangement with said first winding means between said first terminal and said second terminal, a second capacitor means being connected in series with said second winding means between said first terminal and said second terminal, impedance means connected between said first terminal and second terminal, and signal input means connected across said first and second terminals.

18. Binary counter means in accordance with claim 17 in which said first magnetic flux path and said second magnetic flux path have a common portion, said common portion having an airgap therein, and in which said first magnetic flux path and said second magnetic flux path consist of material having a substantially square hysteresis loop characteristic.

19. Binary counter means in accordance with claim 17 in which each of said first magnetic flux path and said second magnetic flux path consists of a closed loop of magnetic material having a substantially square hysteresis loop characteristic.

20. Binary counting means comprising an input pulse source, a tapped winding, and a capacitor connected in a closed series arrangement in the order recited, and an impedance means connected from the tap of said tapped winding to a point between said capacitor and said input pulse source in such a manner as to form a discharge path for said capacitor means, and magnetic core means associated with said tapped winding means and adapted to be energized by current flow through the winding means, said magnetic core means being capable of assuming alternate magnetic remanent states.

21. Binary counter means comprising an input pulse means, a winding having a tap dividing the winding into a first portion and a second portion, and capacitor means, said input pulse means, said first and second portions of said winding and said capacitor means being connected in circuit series arrangement in the order recited, an impedance means connected from the tap of said winding and in parallel with said second portion of the winding and said capacitor means, and a magnetic core means capable of assuming alternate magnetic remanent states, said winding being associated with said magnetic core means for energizing the same upon current flow through the winding.

22. A magnetic device comprising input pulse means, a magnetic core capable of assuming alternate magnetic remanent states, a first winding means wound on said core, a second winding means wound on said core, a capacitance, said input pulse means, said first winding means, said second winding means, and said capacitance being connected in circuit series relation, and impedance means connected across said second winding means and said capacitance.

23. A magnetic counting device including an input pulse source, a first magnetic core capable of assuming alternate magnetic remanent states, a second magnetic core, a first series circuit combination comprising first winding means wound on said first magnetic core, second winding means wound on said first magnetic core, and a first capacitor, a second series circuit combination comprising third winding means wound on said second magnetic core, fourth winding means wound on said second magnetic core, and a second capacitor, first impedance means connected across said second winding means and said first capacitor, second impedance means connected across said fourth winding means and said second capacitor, said input pulse source being connected across the said first series circuit combination, and said input pulse source further being connected across the said second series circuit combination.

24. In an electrical circuit for interconnecting a first magnetic core and a second magnetic core, said first and second magnetic cores both being capable of assuming alternate remanence states of opposite polarity, first and second terminals, a plurality of electric circuit branches connected across said first and second terminals, first winding means associated with said first magnetic core connected in one of said electrical branches, second winding means associated with said second magnetic core and capacitor means connected in series with said second winding means across said first and second terminals in a second of said branches, and impedance means connected across said first and second terminals in a third of said branches.

25. A binary counter comprising a bistable state core of magnetic material exhibiting a substantially rectangular hysteresis characteristic, a coil wound on said core, a source of input pulses coupled to said coil, and energy storage means coupled to said coil to acquire a relatively large charge through said coil from an input pulse arriving from said source as the core resides in one storage state to produce a discharge current through the coil upon termination of the input pulse sufficient to switch said core to the opposite storage state, and to acquire a relatively small charge through said coil from an input pulse arriving as the core resides in said opposite storage state insufficient to produce a discharge current through the coil to substantially alter the storage state of the core.

26. A binary counter comprising a core of magnetic material exhibiting a substantially rectangular hysteresis loop, a coil wound on the said core, a source of input pulses coupled to one end of said coil, and a capacitor coupled to the other end of said coil, whereby said capacitor is selectively charged through said coil by said input pulses and said capacitor passes a reverse discharge current through said coil between successive ones of said input pulses thereby to change selectively the operating point of said core on said hysteresis loop.

27. A binary counter comprising a core of magnetic material exhibiting a substantially rectangular hysteresis loop, a coil wound on the said core, a source of spaced input pulses coupled to one end of said coil, said coil being so wound on said core that it exhibits a relatively low impedance to said input pulses when said core is at one of its remanence points, and exhibits a relatively high impedance to said input pulses when said core is at the other of its remanence points, energy storage means coupled to the other end of said coil, whereby a first input pulse coupled to said coil when said core is at said one point of remanence effects a significant storage of energy in said storage means, the stored energy in said storage means causing a reverse current to flow through said coil after completion of said first input pulse thereby to flip said core to the other of its remanence points preparatory to reception of a second of said input pulses.

28. A flip-flop circuit comprising a magnetic core having a substantially rectangular hysteresis loop, two coils on the core, a first circuit for feeding current in a first direction to the first coil, a second circuit for feeding current in a first direction to the second coil, two condensers for respectively storing the energies passed through said circuits and for effecting reverse current flow through the coils after the cessation of current flow in said circuits in said first directions, the two input circuits and their complementary coils being so related that when currents flow in said first directions in the two circuits they magnetize the core in opposite senses respectively, and output means for giving a signal that varies according to the magnitude of the input signals passing said coils.

29. A flip-flop circuit comprising a magnetic core having a substantially rectangular hysteresis loop, two coils on the core, a first circuit for feeding current in a first direction to the first coil, a second circuit for feeding current in a first direction to the second coil, two condensers for respectively storing the energies passed through said circuits and for effecting reverse current flow through the coils after the cessation of current flow in said circuits in said first directions, the two input circuits and their complementary coils being so related that when currents flow in said first directions in the two circuits they magnetize the core in opposite senses respectively, and output means for giving a signal that varies according to the magnitude of the input signals passing at least one of said coils.

30. A magnetic device comprising in combination a single core of material exhibiting a substantially rectangular hysteresis characteristic, winding means magnetically coupled to said core, a capacitance in circuit with said winding means to provide a discharge path therethrough, a source of signal pulses connected to apply to said winding means and said capacitance current flow such that the capacitance will acquire a sufficient charge to reverse the polarity of the remanence in the core upon discharge through the winding means at the termination of the input pulse when the polarity of magnetic remanence in the core is such that the winding means will present a low impedance to signal pulse, and such that the capacitance acquires a charge insufficient to change the magnetic remanence upon discharge through the winding means when the polarity of magnetic remanence in the core is such that the winding means will present a high impedance to a signal pulse.

31. A magnetic device as defined in claim 30 wherein the winding means comprises two windings magnetically coupled to the core in such polarity that the signal pulses applied respectively thereto cause the core to attain opposite remanence states, and the capacitance comprises a separate capacitor coupled in series circuit with each winding.

32. The combination comprising a bistable state device responsive to signal pulses of different polarities for respectively attaining high and low impedance states, a reactive pulse storage device coupled to produce discharge of stored pulses to said bistable state device to change the state thereof, a source of signal pulses coupled to said bistable state device and said energy storage device for applying signal pulses of enough energy to said energy storage device for storage of a pulse in one of said impedance states of said bistable state device and for applying signal pulses of insufficient energy to said storage device in the other impedance state to permit storage of the signal pulses in said energy storage device.

33. A magnetic core device including first and second magnetic cores, each of said cores having a substantially rectangular hysteresis loop and having a signal winding coupled to each of said cores, and a transfer loop interconnecting each of said signal windings, said loop including a capacitor connected in series circuit relationship with said windings, wherein said windings have substantially the same number of turns and are magnetically oriented with respect to their individual cores to produce magnetic fluxes therein of opposite polarities.

34. A magnetic core device comprising a core of material capable of assuming at least a first state of magnetic remanence in a first polarity and a second state of magnetic remanence in the opposite polarity, a winding on said core, a source of input pulses connected to said winding for driving said core from said first state of magnetic remanence to saturation in said opposite polarity, said winding exhibiting a high impedance to the input pulses driving it from said first state of magnetic remanence toward saturation in said opposite polarity and a low impedance to the input pulse applied once it has reached saturation in said opposite polarity, and reset means connected in series with said winding for receiving said input pulses, said reset means being energized by the input pulse applied once said core has reached saturation in said opposite polarity, and serving, when energized, to apply a magnetizing force to said core to reset said core to said first state of remanence.

35. A magnetic device as in claim 34, wherein said magnetic core is toroidal in shape, wherein the input pulse source supplies pulses each of which is of sufficience energy to completely switch said core from reset remanence to saturation in the direction of the set remanence, so that every second input pulse energizes the reset means and initiates resetting of the core, and wherein said reset means is a condenser.

References Cited in the file of this patent

UNITED STATES PATENTS 2,141,943 Suits ------------------ Dec. 27, 1938

OTHER REFERENCES

Progress Report (2) on the Edvac: vol. II, published June 30, 1946.

Static Magnetic Storage and Delay Line, by An Wang and Way Dong Woo, Journal of Applied Physics, January 1950.